United States Patent
Teshima

(10) Patent No.: US 6,892,255 B2
(45) Date of Patent: May 10, 2005

(54) PROGRAM INSTALL METHOD, FILE RENEWAL METHOD, PROGRAM AND COMPUTER SYSTEM

(75) Inventor: Yoshihiro Teshima, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 15 days.

(21) Appl. No.: 10/412,999

(22) Filed: Apr. 14, 2003

(65) Prior Publication Data

US 2003/0225986 A1 Dec. 4, 2003

(30) Foreign Application Priority Data

Apr. 23, 2002 (JP) ........................................ 2002-120026

(51) Int. Cl.$^7$ .............................................. G06F 13/12
(52) U.S. Cl. .............................. 710/74; 710/9; 711/165; 711/170; 717/174; 717/175
(58) Field of Search ......................... 711/165, 170–173; 710/9, 74; 717/168–178

(56) References Cited

U.S. PATENT DOCUMENTS 5,581,705 A * 12/1996 Passint et al. .............. 709/200
5,715,462 A * 2/1998 Iwamoto et al. ............ 717/173
6,226,739 B1 * 5/2001 Eagle ........................... 713/1

FOREIGN PATENT DOCUMENTS

| JP | 9-146762 A | 6/1997 |
| JP | 10-260860 A | 9/1998 |
| JP | 11-73377 A | 3/1999 |
| JP | 2001-297021 A | 10/2001 |

* cited by examiner

*Primary Examiner*—Kim Huynh
*Assistant Examiner*—Mike Nguyen
(74) *Attorney, Agent, or Firm*—Frishauf, Holtz, Goodman & Chick, P.C.

(57) ABSTRACT

A method of installing a program or renewing a file. A first program or file stored on a first memory area is copied to a second memory area. Position-information memory area is updated with position information indicating a location on the second memory area where the first program or file is copied or stored. Then, a second program or file is written into the first memory area, and the position-information memory area is updated again with position information indicating a location on the first memory area where the second program or file is written. With use of the above method, even though an unexpected error should occur during the course of installing the second program or file, the original program or file can be immediately recovered. An easy to use method of installing a program or renewing a file is provided, which reduces burden of time consuming operation by a user.

7 Claims, 4 Drawing Sheets

VERSION UPGRADE TO OS/APPLICATION

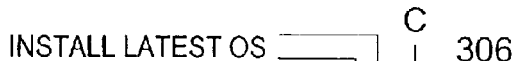

PROGRAM INSTALL METHOD, FILE RENEWAL METHOD, PROGRAM AND COMPUTER SYSTEM

FIELD OF THE INVENTION

The present invention generally relates to a method of installing a program, a method of renewing a file, and more particularly to a program for effecting these features on a computer or on a computer system.

BACKGROUND OF THE INVENTION

In recent, various manufacturers are active in a computer business and these manufacturers have been competing in developing computer technology. As a result, version upgrades to their computer programs and operating system programs have been made available in extremely short cycles. With the rapid popularization of the internet, these upgrades of the computer program and/or the operating system program are more frequently delivered or distributed over networks. Further, a data file has been greatly increased in data size due to enhanced features of application software, and meanwhile storage media of an enormous memory capacity such as DVD-RAM have been developed and put into use for storing these data files.

For version upgrade or installation of the application software or renewal of a file, in most cases is generally employed a technique of overwriting the version upgrade of such application software or a new file directly onto the original application software or the original file.

But the above conventional installation or renewal method inherently involves serious problems, as set forth below.

In the conventional method of overwriting the application software or the new file directly on the original software or file, when an unexpected error should occur while such overwriting operation of the upgrade or the new file is under process, the overwriting operation will not only be completed but also the original application software or file will be destroyed, and further data which have been created in a long time period will be lost instantly, and at the worst the operating system that has been running normally is brought to show awkward behavior or not to work in a normal manner.

Especially, should such unexpected error occur during upgrading operation of the operating system program, a fatal damage shall be invited in a computer system, resulting in destruction of the operating system program. Therefore, it is almost impossible for a user to recover from the unexpected trouble, since the computer system itself does not work at all. In such case, the user of the computer system often has to give up his (or her) created and accumulated data and is forced to initialize the computer system to install the operating system again. The above trouble has been left a long time to be solved quickly. In particular, with wide use of the network for distributing the computer programs, it is expected that opportunities will increase that communication errors shall occur during the course of overwriting operation of the program or data, and therefore it will be most important to solve the above mentioned troubles quickly.

SUMMARY OF THE INVENTION

The present invention has been made for solving the problems involved in the conventional computer techniques, and its object is to provide a method of installing program, a method of renewing a file, and to provide a program for effecting these features on a computer or on a computer system. These methods allow quick recovery of an original program or data, even though an error should occur while computer software or data are under update or renewal operation, and reduce burden on a user of a computer in the installation or renewal operation.

It is an aspect of the invention to provide a program installing method in a computer with a storage device including at least a first memory area where a first program is stored, and a position-information memory area where position-information is written, the position-information indicating a location where the first program has been stored, which program installing method comprises the steps of making a copy of the first program stored on the first memory area and storing the copy of the first program on a second memory area, updating the position-information memory area with position-information indicating a location on the second memory area where the copy of the first program has been stored, writing a second program on a memory area including at least a part of the first memory area; and further updating the position-information memory area with position-information indicating a location on the memory area where the second program is written, after the second program has been written on the memory area.

It is another aspect of the invention to provide a program installing method in a computer with a storage device including at least a first memory area where a first program is stored, and a position-information memory area where position-information is written, the position-information indicating a location where the first program has been stored, which program installing method comprises the steps of making a copy of the first program stored on the first memory area and storing the copy of the first program on a second memory area, updating the position-information memory area with position-information indicating a location on the second memory area where the copy of the first program has been stored, writing a second program on a memory area including at least a part of the first memory area, further updating the position-information memory area with position-information indicating a location on the memory area where the second program is written, after the second program has been written on the memory area, previously making a copy of information stored on the second memory area and storing the copy of the information on another memory area before the copy of the first program has been stored on the second memory area, and storing on the second memory area again the copy of the information previously stored on the another memory area after the position-information memory area has been updated with the position-information indicating the location on the memory area where the second program is written.

It is still another aspect of the invention that in the above mentioned program installing methods, the position information indicating a location where a program has been stored, includes either of a start-position where the program starts operation, a leading address, or a tail address of a memory where the program has been stored.

It is yet another aspect of the invention to provide a file renewal method in a computer with storing means including a first memory area where a first file is stored and a position-information memory area where position-information is written, the position-information indicating a location on the first memory area where the first file has been stored, which file renewal method comprises the steps of making a copy of the first file stored on the first memory area and storing the copy of the first file on a second memory area, updating the position-information memory area with position-information indicating a location on the second memory area where the copy of the first file has been stored, writing a second file on a memory area including at least a part of the first memory area, further updating the position-information memory area with position-information indicating a location on the memory area where the second file is written, after the second file has been written on the memory area.

BREIF DESCRIPTION OF THE DRAWINGS

The accompanying drawings illustrate preferred embodiments of the invention, and together with the detailed description of the preferred embodiments given below serves to explain the principles of the invention.

DETAILED DESCRIPTION OF THE INVENTION

Figure 1:
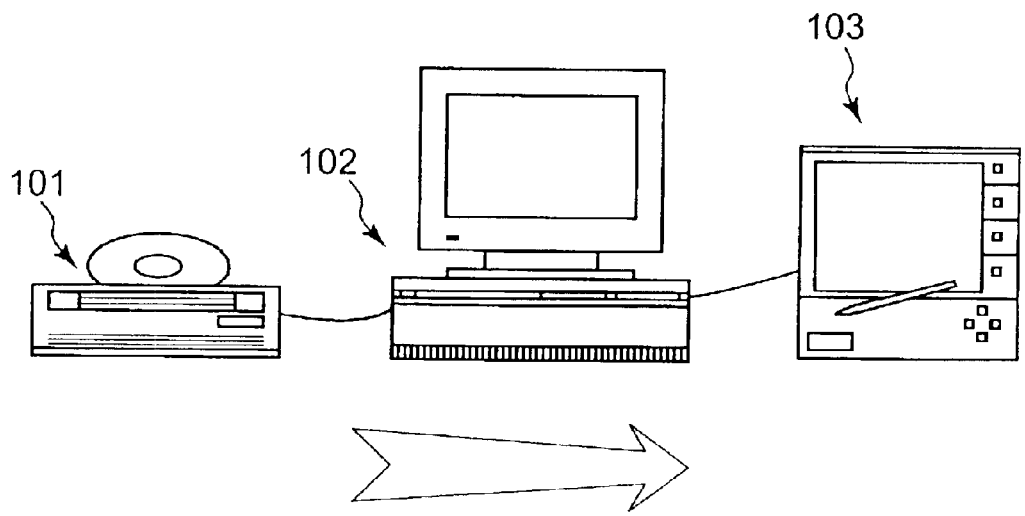
FIG. 1 is a view showing a structure of a computer system according to an embodiment of the invention.

Now, an embodiment of the invention will be described in detail with reference to the accompanying drawings. The present embodiment of the invention shows, by way of example, a version upgrade operation of an operating system program (hereafter, "OS" program) on a personal digital assistant (hereafter, "PDA") such as a portable type terminal device with a personal computer connected thereto. FIG. 1 is a view showing a structure of a computer system according to the embodiment of the invention.

Figure 2:
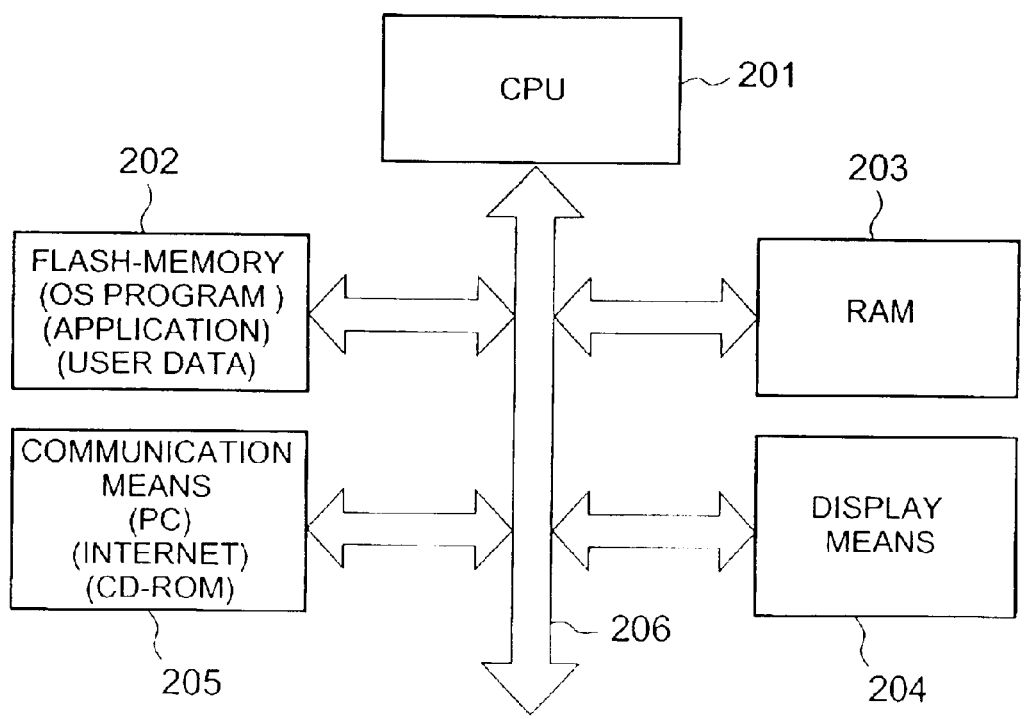
FIG. 2 is a view illustrating by way of example a hardware structure of a terminal device 103 shown in FIG. 1.

In FIG. 1, a terminal device 103 comprises a portable type digital assistance, which has for example a structure for executing a program, shown in FIG. 2. A personal computer 102 with the terminal device 103 connected thereto reads out a new operating system program stored in CD-ROM 101, and writes the same on the terminal device 103, whereby the new operating system program is installed on the terminal device 103.

In addition to the new operating system program, on the CD-ROM 101 are stored an install program, which runs on the personal computer 102, other install program, which runs on the terminal device 103, and program code data of a backup-restore program, which make a backup copy of user's data stored in the terminal device 103 and restore the same in the personal computer 102.

FIG. 2 is a view illustrating by way of example a hardware structure of the terminal device 103 shown in FIG. 1.

In FIG. 2, CPU 201 controls whole operation of the terminal device 103, and reads out through a bus 206 the operating system program and other application program stored in storing means or a flash memory 202, executing the same. Further, in the terminal device 103, the CPU 201 is connected through the bus 206 with RAM 203, which is used by the CPU 201 for execution of a program, display means 204 for displaying for example the results of the execution of the program, and communication means 205, which is adapted to be connected to an interface, another personal computer (PC) and CD-ROM.

Figure 3A:
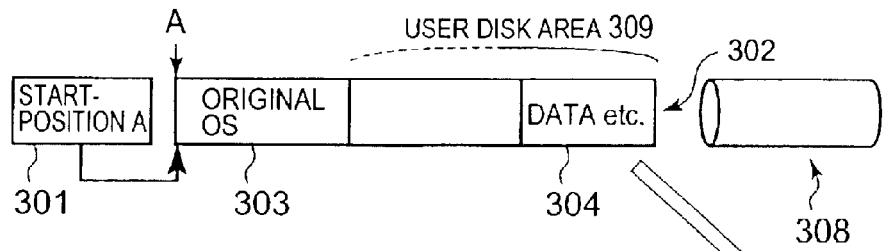
FIGS. 3A to 3G illustrate memory maps of the terminal device 103 and a personal computer in the embodiment.
Figure 3B:
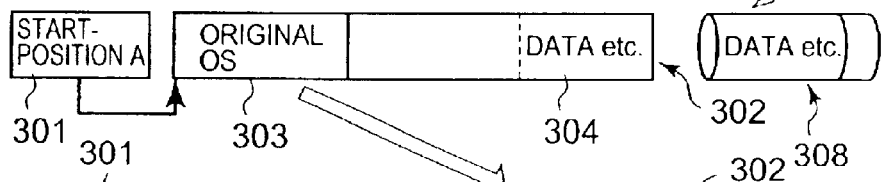
Figure 3C:
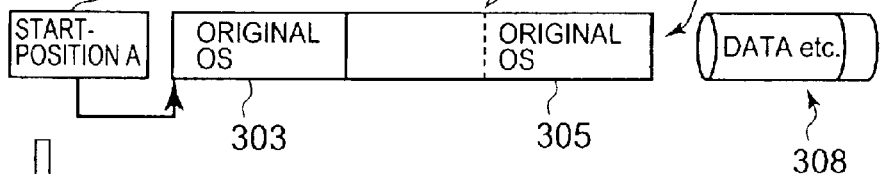

Now, a method of installing a program will be described in detail with reference to FIGS. 3A to 3G and FIG. 4. FIGS. 3A to 3G are views illustrating memory maps, which simply represent changes over time of contents stored in the flash memory 202 of the terminal device 103 in the computer system of the present embodiment and in a hard disk cf the personal computer 102. FIG. 4 is a flowchart showing processes for installing a program in the embodiment.

As shown in FIGS. 3A to 3G, a part of the flash memory 202 of the terminal device 103 is assigned to a position-information memory area 301, where an address indicated as A is stored. The address A represents a position (a start position) from which OS program stored in a first memory area 303 starts its operation. The position-information memory area 301 is referred to boot the OS program, when the terminal device i03 is turned on.

The flash memory 202 of the terminal device 103 also includes a main memory area 302 which has the first memory area 303 for storing the OS program and a memory area for storing user data 304. A user disk area 309 is a memory area prepared in the main memory area 302 excluding a system area where the OS program is stored. The user disk area 309 is used for storing data files created by the user and other various configuration files.

Other storing means 308 comprises the hard disk and a memory mounted in the personal computer 102.

Now, referring to FIGS. 3A to 3G and FIG. 4, the processes for installing a program in the embodiment will be described. Taking as an example, the processes will be described, for upgrading the OS program which has been already installed on the terminal device 103.

At first, an OS install program is set to run on the personal computer 102 at step S401.

Then, the contents of the user disk area 309 are copied to other storing means 308 at step s402. In other words, a copy of the user data 304 stored in the flash memory 202 of the terminal device 103 is made, and the copy of the user data 304 is stored in the other storing means 308 such as the hard disk or other memory of the personal computer 102, as illustrated at FIG. 3A and FIG. 3B.

At step S403, the OS program (hereafter original OS program which is currently in operation is copied to the user disk area 309. That is, a copy of the original OS program stored in the first memory area 303 is made and stored on a second memory area 305 as illustrated at FIG. 3B and FIG. 3C. The memory area where the user data 304 was previously stored, which data is now copied to other area at step S402, and second memory area 305 where the original OS program is copied seem to be prepared redundantly in FIGS. 3A to 3G, but if there is left in the user disk area 309 a memory area enough to store the original OS program, then, the process at step S402 may be omitted, and it will be possible that the second memory area 305 is secured in a memory area where the user data is not overwritten and the OS program may be copied to the secured memory area.

At step S404, the address of the start position of the OS program (start-position information A) previously stored on the position-information memory area 301 is rewritten. In other words, the position-information memory area 301 where the start-position information A of the first memory area 303 where the original OS program has been stored, is updated with start-position information B of the second memory area 305, where the original OS program is copied at step S403.

Figure 3D:
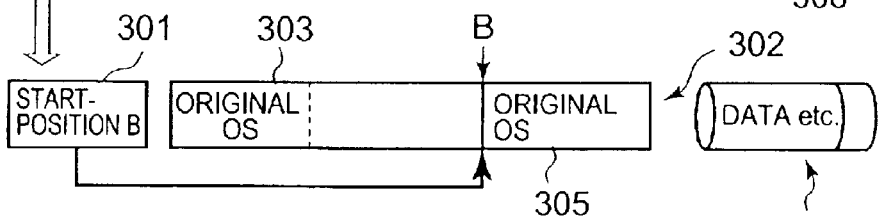
Figure 3E:
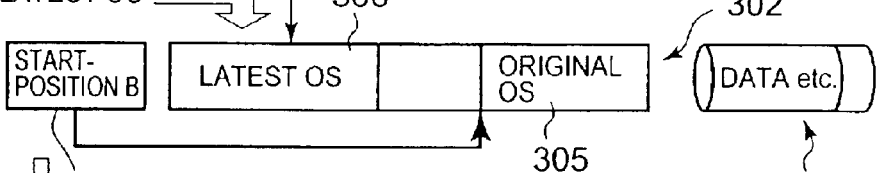
Figure 4:
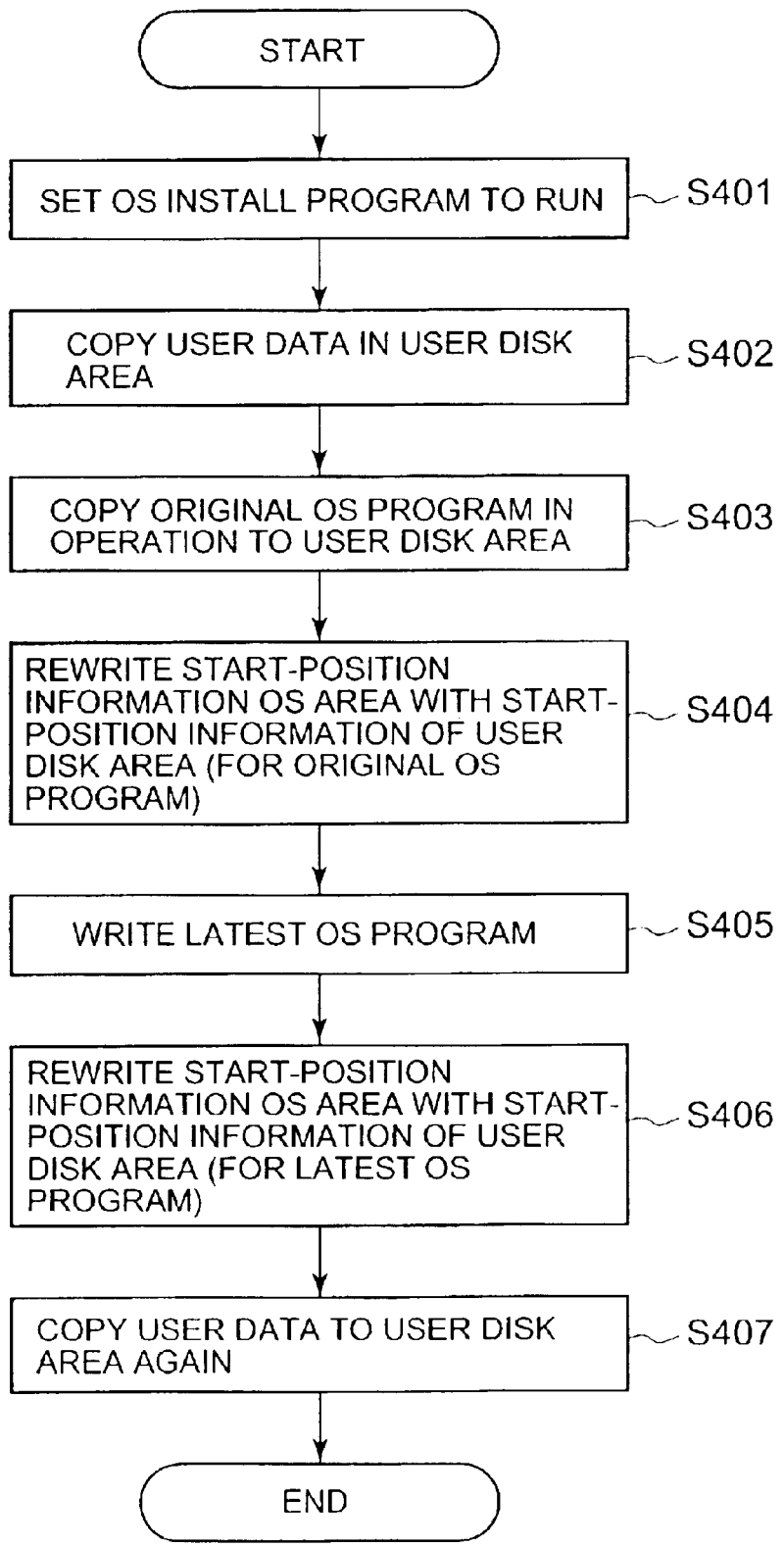
FIG. 4 is a flowchart showing processes for installing a program in the embodiment.

An upgrade version of the original OS program (hereafter, latest OS program) is written on the flash memory 202 at step S405, that is, the latest OS program 306 is written on a memory area including the first memory area 303 where the original OS program was previously stored, as illustrated at FIG. 3D and FIG. 3E. In the present embodiment, the personal computer 102 is used to install the latest OS program. The personal computer 102 reads out a program from CD-ROM 101, and writes the same into the terminal device 103. Alternatively, it may be possible to obtain the latest OS program data from a host computer such as a file server connected to through the network instead of from CD-ROM 101. Further, the terminal device 103 may obtain data directly from the CD-ROM 101, or from the server through the network without using the personal computer 102.

Figure 3F:
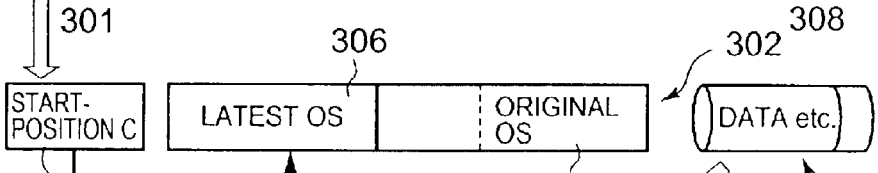

Once the latest OS program is successfully written at step S405, the start-position information of OS area which has been written on the position-information memory area 301 is rewritten again at step S406. That is, the start-position information B of the second memory area 305 where the original OS program is stored is rewritten to a start-position information C of the latest OS program 306 which has been written at step S405, as shown in FIG. 3E and FIG. 3F. It should be noted that the start-position information C of the latest OS program 306 need not necessarily coincide with the start-position information B of the original OS program, but it will be enough that the start-position information C of the latest OS program 306 represents a start-position information given to an OS program.

Figure 3G:
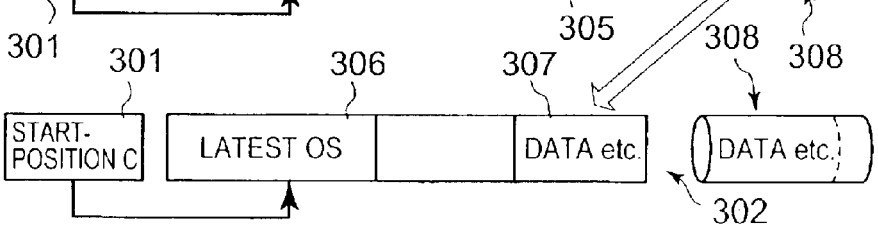

At step S407, the contents of the user disk area 309 previously copied to the other storing means 308 are copied to the flash memory 202, again. In other words, data such as user data which was previously stored in the other storing means 308 for safety purpose is copied to an original memory area 307 as shown in FIG. 3F and FIG. 3G.

According to the program installing method described above, since the version upgrade of program is installed in the above mentioned manner, should an expected error occur during overwriting operation of the latest program, the original program can hardly be destroyed or lost.

Next, operation to be performed will be described when some error has occurred in each of program installation processes illustrated in FIGS. 3A to 3G.

In a conventional method of version upgrade that the latest program is directly overwritten on the original program, an error occurrence in any process will cause troubles in operation of the OS program.

Meanwhile, when an error should occur in a certain process in the installing operation according to the present invention, various operations will be performed depending on at which step or process such error has occurred.

In case of interruption occurred at FIG. 3A, no trouble is brought, since contents in the memory areas are not changed at all and the program remains in a state before the installation operation starts.

In case of interruption occurred between FIG. 3A and FIG. 3B, no trouble is brought, since contents in the flash memory 202 of the terminal device, that is, the contents in the position-information memory area 301 and the main memory area 302 are not changed at all, and remain in the same state as FIG. 3A, and therefore the program remains in an original state as before the installation operation starts. Further, in case of interruption occurred at FIG. 3B, no trouble occurs as in the above cases.

In case of interruption occurred between FIG. 3B and FIG. 3C, the original OS program has been already overwritten on the memory area where the user data 304 were previously stored. But nothing in the first memory area 301 where the original OS program was previously stored and in the position-information memory area 301 is changed yet, and the original OS in the terminal device is not destroyed. Therefore, the OS program can run on the terminal device 103 without any trouble. In case of interruption occurred at FIG. 3C, no trouble occurs as in the above case.

In case of interruption occurred between FIG. 3C and FIG. 3D, information in the position-information memory area 301 is destroyed, and the OS program can not run on the terminal device 103.

But, in case of interruption occurred at FIG. 3D, the OS program of the terminal device 103 can run without any trouble, because the start-position information B of the original OS program copied to the second memory area 305 has been already memorized on the position-information memory area 301. In this case, the original OS program stored in the second memory area 305 runs in place of the OS program stored in the first memory area 303.

In case of interruption occurred between FIG. 3D and FIG. 3E, the latest OS program 306 has not yet been successfully written and is destroyed. But the original OS program has been copied to the second memory area 305, and the start-position information of the original OS program copied to the second memory area 305 has been memorized in the position-information memory area 301, and therefore the original OS program can run on the terminal device 103 without any trouble.

In case of interruption occurred at FIG. 3E, since the latest OS program has been successfully written, and the position-information memory area 301 has not yet been written, the terminal device 103 is allowed to boot on the original OS program stored in the second memory area 305 in place of the original OS program, and therefore the system can work without any trouble. More specifically, in the event that the upgrade operation of the OS program is interrupted, when only a writing operation of the latest OS program 306 has been completely finished with the start-position information A of the original OS program memorized in the position-information memory area 301, in other words, in the event the upgrade operation of the OS program is interrupted, when the latest OS program has been completely overwritten on the original OS program with the position-information memory not yet renewed, as in the conventional manner, then the latest OS program will not run in a normal manner, and can go out of control at the worst, since the position-information memory area 301 memories position information A can represent wrong start-position information for the latest OS program.

In case of interruption occurred between FIG. 3E and FIG. 3F, the terminal device 103 can not boot on the OS program, since the contents of the position-information memory area 301 has been destroyed.

In case of interruption occurred between FIG. 3F, the terminal device 103 can boot on the latest OS program 306 in the normal manner, since in the position-information memory area 301, the contents have been rewritten to the start-position information C of the latest OS program 306.

In case of interruption occurred between FIG. 3F and FIG. 3G, since data which has been previously copied in the other storing means 308 can not be repaired correctly, the installing operation is interrupted with the user data destroyed, which user data is to be copied to the original memory area 307. But since data in the position-information memory area 301 and the latest OS program remain in a normal condition, the terminal device 103 is allowed to run normally.

As described above, it will be found that, according to the installing method of the present invention, the terminal device is not allowed to start up, only when an error occurs in the installing operation between FIG. 3C and FIG. 3D, and between FIG. 3E and FIG. 3F.

In the embodiment, what is memorized on the position-information memory area 301 is address data which indicates a position on the memory where a program is stored, and a data size of the address data is generally no more than several bytes. Meanwhile, the OS program is far larger in data size compared with the position information, and its data is of an order of several kilobytes or several megabytes. Therefore, a possibility of occurrence of an error in the installing operation between FIG. 3C and FIG. 3D or between FIG. 3E and FIG. 3F will be extremely low, and accordingly the chance of failure in booting the terminal device 103 could be reduced, even though the error should occur during the program install operation.

Figure 5:
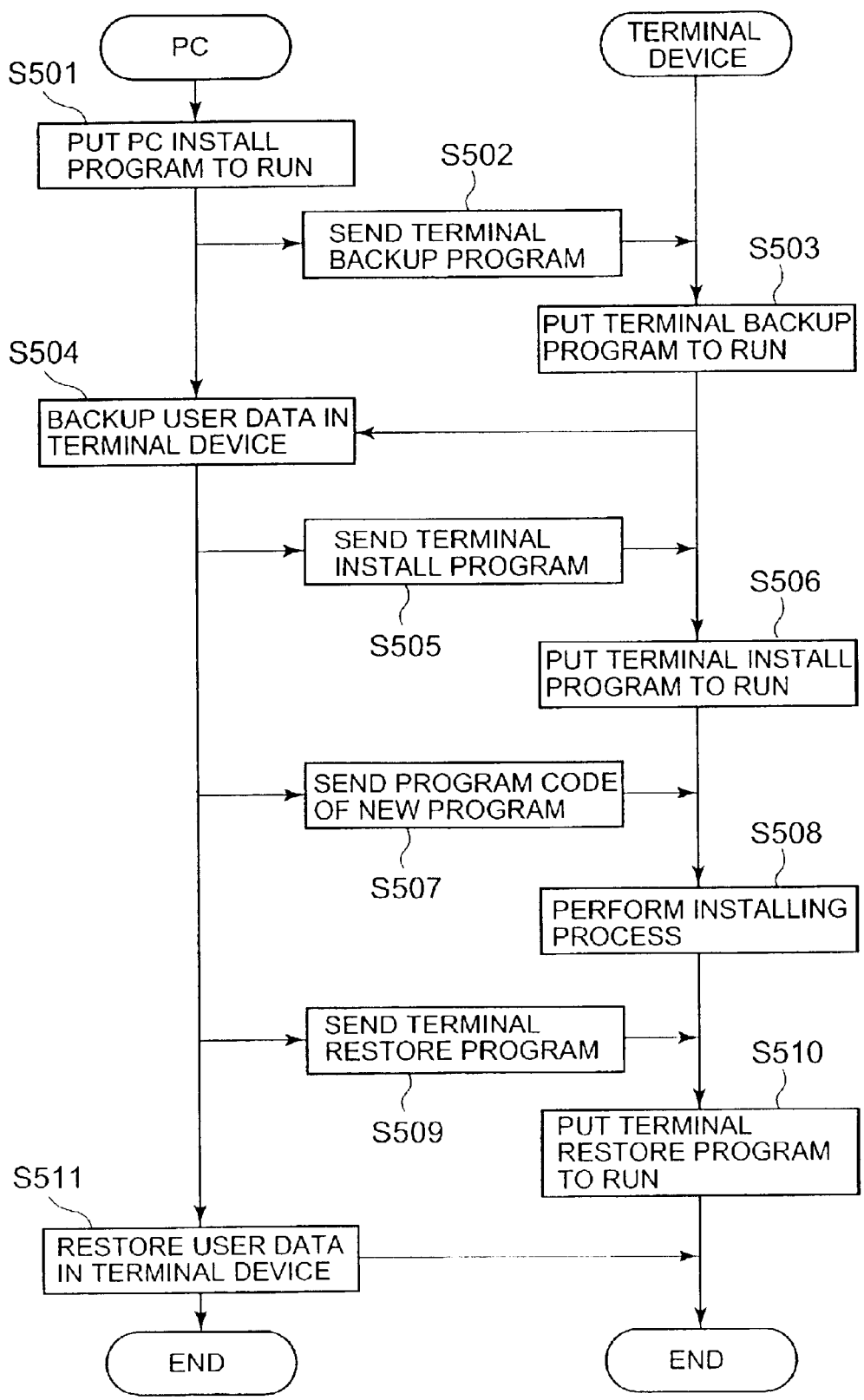
FIG. 5 is a flowchart showing whole operation of the computer system for installing an operating system program on the terminal device 103 according to the invention.

Now, with reference to FIG. 5 will be described OS program upgrade operation of the whole computer system according to the present invention, in which computer system the personal computer and the portable type data terminal device such as PDA connected to the personal computer are included and a version upgrade of OS program is installed to the data terminal device.

At first, the user starts up a PC installation program on the personal computer at step S501. The PC installation program is read out from CD-ROM 101 and executed on the personal computer 102.

The PC installation program sends a terminal backup program to the terminal device 103 at step S502, and the terminal backup program is set to start up on the terminal device 103 at step S503.

Once the terminal backup program has started up, user data in the terminal device 103 is sent the personal computer 102, in which a backup copy of the user data is made and stored in its internal storing device at step S504. Generally, the backup copy or backup of data is made in cooperation of the PC installation program and the terminal backup program, or the personal computer 102 makes the same by directly accessing to the flash memory of the terminal device 103. This process corresponds to step S402 in FIG. 4.

When the backup copy of the user data in the terminal device 103 or the backup of data has been made, the PC installation program sends a terminal installation program to the terminal device 103 at step S505, and sets the terminal installation program to start up on the terminal device 103 at step S506.

Further, the PC installation program sends to the terminal device 103 program code data of new terminal-program to be installed at step S507. Upon receipt of the program code data, the terminal device 103 executes an installing process at step S508. The installing process at step S508 corresponds to the processes at step S403 through step S407 in FIG. 3 and FIG. 4 described above. When the installing process has been finished, the terminal device 103 makes a list of the user data by referring to the backup copy made at step S504, at step S509 through step S511.

With use of the installing method according to the present invention, the computer system can be prevented from being disabled to start up, even though an unexpected error should occur while the version upgrade operation of the OS program is performed in the terminal device with the personal computer connected.

In the embodiment, the method is described by way of example of installing the version upgrade of the OS program to the terminal deice with the personal computer connected thereto, but various modifications to the above embodiment may be made.

For example, as the terminal device in the embodiment, an average personal computer, a cellar phone, and time counting device may be used. The method of installing the version upgrade of program according to the present invention may be also applied to a game machine, a terminal device, an automatic vending-machine type terminal, and the like, which are installed in convenience stores or other public space. In particular, the present invention may be effectively applied to a terminal device of a type that program or files are delivered or distributed over the networks, in which communication errors are expected to occur more frequently.

The present invention may be applied to a system in which a personal computer (terminal computer) is used as the terminal device, and installing of an upgrade program or renew of a file is performed on the terminal computer with CD-ROM and DVD-RAM directly connected thereto. When CD-ROM is connected to the terminal computer, a hard disk, a floppy disk, and a magneto-optical disk may be used as other memory device. Further, when DVD-RAM is connected to the terminal computer, the DVD-ROM may be used both ways as a medium for supplying the installation program and as other storing means.

Further, the present invention may be put into practical use with use of various storage media of a large memory capacity, which will be developed in future, including a next-generation optical storage disc using a blue laser such as Blue-ray disc, Advanced Optical Disc, HD-DVD9 using a red laser, and Blue Laser DVD using a blue-violet laser, in addition to the storage devices such as CD-ROM and DVD-ROM as set forth above.

The invention may be applied to install version upgrade of an application program for the terminal device featuring various functionalities such as document creation and/or management, and further to installing upgrade of a program allowing the terminal devices installed in the public space to effect their unique features.

In the embodiment, the latest OS program, a new program, and the installer (new software) are obtained from CD-ROM 101, but these new programs may be obtained from a host computer and a server computer via the networks, or form a hard disk or other storing medium.

Further, the program installing method of the present invention is featured in its simplicity of operation as set forth below. That is, the start-position information including an address on the memory from which the OS program starts its operation is memorized in the position-information memory area 301, and the OS program is allowed to start its operation from the address included in the start-position information stored in the position-information memory area 301 without any additional process to be performed. In the meantime, for enjoying the similar simplicity in operation, it may be possible to store the leading address or the tail address of the program file in place of the above mentioned start-position information. Further, the features of the present invention may be also enjoyed by memorizing in the position-information memory area 301 a value, such as a value less than the leading address by a certain value, or a value which has a predetermined relationship with the leading and/or tail address of the OS program. In short, any information depending on which the start-position of the OS program can be calculated may be used in place of the start-position information memorized in the position-information memory area 301 in the embodiment.

It will be easily understood that the present invention may be applied not only to the program installation but also to data-file renewal. For instance, the present invention may be applied to a management system or a management software for managing plural files. In the management system, a table is prepared, in which a leading address of each of the plural files to be renewed or updated is memorized, and at first, contents of the file are not directly renewed or updated but the file is temporarily copied to other memory area, and a leading address of the copied file is memorized in the table, and then, the contents of the file are renewed, and finally the table is rewritten to the original data, again. In this way, the present invention may be applied to the renewal of files.

Further, it will be very useful to apply the present invention to update or renewal of files, such as a file of customer's record of usage and a file of customer information, which are used by a service provider, or a banker, because loss or damage to these files, which will be caused during the overwrite or update process, will result in extremely material obstacles to them. Furthermore, it will be also beneficial to use the program-update install method or the file-renewal method of the present invention to update or renew contents or a program for contents playback equipment such as KARAOKE communication-terminal equipment, because it seems difficult due to a limited memory area in such equipment to renew files while making a backup copy, or using a storage device such as a hard disk of a large capacity.

The present invention provides an easy to use system which reduces burden of processes and load in user's operation, because a process may be omitted to recover original program or file, for copying a backup copy of the program or the file each time when an error should occur during the program installation operation or the file renewal operation. Further, the easy to use system has a feature that prevents a trouble of losing a location of the backup file.

According to the invention, since the user is not required to periodically make a backup copy of data, there is no need to install a file server specialized for a backup purpose. Therefore, the present invention contributes to reduce costs required by the whole system.

In general, system boot program such as the OS program may be stored on a predetermined memory area, or the memory may be scanned from the leading address to the start-position of the OS program when the system is set to start up. In the latter, it is preferable that the OS program is stored at the memory area beginning from the leading address, because the OS program is read out at first and allowed to start up promptly. In this regard, according to the program installing method of the present invention, the upgrade of program can be stored on the same memory area as the original program was stored, so that the upgrade of the program can have the same start-position information as the original program. Differently from the conventional way, in which the upgrade of the program is stored at a different memory area from the memory area where the original program was stored, the present program installing method stores the upgrade of the program at the same memory area as the original program. Therefore, the system is allowed to start up promptly under a certain condition, and the memory areas for the program and files are easily managed, and as a result, efficiency in design work is improved and a superior computer system will be provided.

A conventional software such as an application program employs techniques that make user interface easy to use by providing, so-called, short cuts associated with the application program. The present invention may be applied to the above techniques. In other words, if a link address of the short cut is used as the position information according to the present invention, the short-cut link will not be broken, inviting a not serious problem, even though an error should occur during the program upgrade operation.

In the conventional computer system is employed a backup system, in which, when a file is overwritten or updated, program automatically makes a backup file with an extension ".bak". But in such backup system, the file is simply copied to make a file with another file name before the overwriting operation is performed, and therefore the user is required to search the backup file to recover the original file, when an error should occur during the overwriting operation. With use of the present invention, the user is not required to perform the above mentioned troublesome operation.

Further, in the conventional backup system, even if the backup file with a different file name has been prepared, the short-cut link is broken, since the file name of the original file is different from the backup file, and therefore, the conventional backup system may invite a fatal damage that at the worst the backup file can not be located and whole data is lost. This fatal damage may be avoided by use of the present invention.

Moreover, according to the conventional backup method, the user has to repair the original file by copying the backup file, every time he (or she) fails in overwriting of a file. Therefore, the conventional backup method gives the system a load of the file-repairing process, and is inconvenient for the user, because he is required to do the above repairing operation. In particular, since the OS program is of a large file size, the repairing operation performed every failure of the overwriting operation will take thousands of man-hours. However, the present invention does not request the user to perform the repairing operation to copy the backup copy, providing a system convenient for the user.

Further, in a file system for a hard disk, CD-RW, and DVD-RAM, such a structure as keeps in a table locations or addresses of directories or contents of files is used, as is employed for instance in ISO 9660, Universal Disk Format (UDF), and FAT 32. The present invention may be applied to the above file system. More specifically, using the position-information memory area of the present invention as a memory area for memorizing the locations and addresses of the directory or file contents, the present invention may be applied to a storage medium of a large memory capacity to safely and effectively renew files.

What is claimed is:

1. An operating system program rewriting method for use in a personal digital assistant having a storage device including at least: (i) a first memory area where an operating system program is stored, (ii) a position-information memory area where position-information indicating a storage location of the operating system program is written, and (iii) a second memory area where at least data of a user is stored, the operating system program rewriting method comprising:

transferring the data of the user stored in the second memory area to a memory of a personal computer;

making a copy of the operating system program stored in the first memory area and storing the copy of the operating system program in the second memory area;

rewriting the position-information written in the position-information memory area so as to indicate a location in the second memory area where the copy of the operating system program has been stored;

writing in the first memory area another operating system program transferred from the personal computer;

rewriting the position-information so as to indicate a location in the first memory area where said another operating system program has been written; and returning the data of the user stored in the memory of the personal computer to the second memory area, after the position-information has been rewritten.

2. The operating system program rewriting method according to claim 1, wherein the position-information includes one of a start-position where the operating system program starts operation, a leading address of a memory where the operating system program has been stored, and a tail address of the memory where the operating system program has been stored.

3. The operating system program rewriting method according to claim 1, wherein the operating system program and the said another operating system program are different.

4. A program rewriting program for use in a personal digital assistant having a storage device including at least: (i) a first memory area where an operating system program is stored, (ii) a position-information memory area where position-information indicating a storage location of the operating system program is written, and (iii) a second memory area where at least data of a user is stored, the program rewriting program comprising:

transferring the data of a user stored in the second memory area to a memory of a personal computer;

making a copy of the operating system program stored in the first memory area and storing the copy of the operating system program in the second memory area;

rewriting the position-information written in the position-information memory area so as to indicate a location in the second memory area where the copy of the operating system program has been stored;

writing in the first memory area another operating system program transferred from the personal computer;

rewriting the position-information so as to indicate a location in the first memory area where said another operating system program has been written; and returning the data of the user stored in the memory of the personal computer to the second memory area, after the position-information has been rewritten.

5. The program rewriting program according to claim 4, wherein the position-information includes one of a start-position where the operating system program starts operation, a leading address of a memory where the operating system program has been stored, and a tail address of the memory where the operating system program has been stored.

6. The operating system program rewriting program according to claim 4, wherein the operating system program and said another operating system program are different.

7. A computer system comprising:

first memory means for storing an operating system program;

second memory means for storing at least data of a user;

position-information memory means for storing position-information indicating a storage location of the operating system program in the first memory means;

data transferring means for transferring the data of the user stored in the second memory means to a memory of a personal computer;

program copying means for making a copy of the operating system program stored in the first memory means and for storing the copy of the operating system program in the second memory means;

first rewriting means for rewriting the position-information so as to indicate a location in the second memory means where the copy of the operating system program is stored;

program writing means for writing in the first memory means another operating system program transferred from the personal computer;

second rewriting means for rewriting the position-information so as to indicate a location on the first memory means where said another operating system program has been stored; and returning meane for returning the data of the user stored in the memory of the personal computer to the second memory means, after the position-information has been rewritten by the second rewriting means.

* * * * *